(12) United States Patent
Liu et al.

(10) Patent No.: US 10,686,214 B2
(45) Date of Patent: Jun. 16, 2020

(54) SANDWICH ELECTRODES AND METHODS OF MAKING THE SAME

(71) Applicant: Enevate Corporation, Irvine, CA (US)

(72) Inventors: Xiaohua Liu, Irvine, CA (US); Giulia Canton, Lake Forest, CA (US); David J. Lee, Irvine, CA (US); Shiang Teng, Irvine, CA (US); Benjamin Yong Park, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 40 days.

(21) Appl. No.: 15/994,976

(22) Filed: May 31, 2018

(65) Prior Publication Data

US 2019/0181492 A1 Jun. 13, 2019

Related U.S. Application Data

(60) Provisional application No. 62/596,019, filed on Dec. 7, 2017.

(51) Int. Cl.
*H01M 10/0525* (2010.01)
*H01M 4/583* (2010.01)
(Continued)

(52) U.S. Cl.
CPC ..... *H01M 10/0525* (2013.01); *H01M 4/0404* (2013.01); *H01M 4/134* (2013.01);
(Continued)

(58) Field of Classification Search
CPC .. H01M 10/0525; H01M 4/134; H01M 4/386; H01M 4/583; H01M 2004/028;
(Continued)

(56) References Cited

U.S. PATENT DOCUMENTS

| 3,990,098 A | 11/1976 | Mastrangelo |
| 5,468,358 A | 11/1995 | Ohkawa et al. |

(Continued)

FOREIGN PATENT DOCUMENTS

| CN | 1667855 | 9/2005 |
| CN | 102834955 | 12/2012 |

(Continued)

OTHER PUBLICATIONS

Choi et al., "Enhanced Electrochemical Properties of a Si-based Anode Using an Electrochemically Active Polyamide Imide Binder", Journal of Power Sources, 2008, vol. 177, pp. 590-594.

(Continued)

*Primary Examiner* — Gary D Harris
(74) *Attorney, Agent, or Firm* — McAndrews, Held & Malloy

(57) ABSTRACT

In some embodiments, an electrode can include a first and second conductive layer. At least one of the first and second conductive layers can include porosity configured to allow electrolyte to flow therethrough. The electrode can also include an electrochemically active layer having electrochemically active material sandwiched between the first and second conductive layers. The electrochemically active layer can be in electrical communication with the first and second conductive layers.

20 Claims, 9 Drawing Sheets

(51) Int. Cl.

| | |
|---|---|
| H01M 4/38 | (2006.01) |
| H01M 4/134 | (2010.01) |
| H01M 4/62 | (2006.01) |
| H01M 4/66 | (2006.01) |
| H01M 4/36 | (2006.01) |
| H01M 4/04 | (2006.01) |
| H01M 4/74 | (2006.01) |
| H01M 4/1395 | (2010.01) |
| H01M 4/02 | (2006.01) |

(52) U.S. Cl.
CPC ......... *H01M 4/1395* (2013.01); *H01M 4/364* (2013.01); *H01M 4/386* (2013.01); *H01M 4/583* (2013.01); *H01M 4/625* (2013.01); *H01M 4/661* (2013.01); *H01M 4/74* (2013.01); *H01M 4/742* (2013.01); *H01M 2004/027* (2013.01); *H01M 2004/028* (2013.01)

(58) Field of Classification Search
CPC .. H01M 2004/027; H01M 4/742; H01M 4/74; H01M 4/661; H01M 4/625; H01M 4/364; H01M 4/1395; H01M 4/0404
USPC .................................................... 429/231.95
See application file for complete search history.

(56) References Cited

U.S. PATENT DOCUMENTS

| | | | |
|---|---|---|---|
| 5,624,606 A | 4/1997 | Wilson et al. | |
| 5,682,288 A | 10/1997 | Wani | |
| 5,981,107 A | 11/1999 | Hamano et al. | |
| 6,103,423 A | 8/2000 | Itoh et al. | |
| 6,287,728 B1 | 9/2001 | Kajiura et al. | |
| 6,300,013 B1 | 10/2001 | Yamada et al. | |
| 6,413,672 B1 | 7/2002 | Suzuki et al. | |
| 6,432,579 B1 | 8/2002 | Tsuji et al. | |
| 6,436,576 B1 | 8/2002 | Hossain | |
| 6,489,061 B1 | 12/2002 | Hossain | |
| 6,589,696 B2 | 7/2003 | Matsubara et al. | |
| 6,770,399 B2 | 8/2004 | Umeno et al. | |
| 6,946,223 B2 | 9/2005 | Kusumoto et al. | |
| 6,949,314 B1 | 9/2005 | Hossain | |
| 7,037,581 B2 | 5/2006 | Aramata et al. | |
| 7,202,000 B2 | 4/2007 | Iriyama et al. | |
| 7,303,838 B2 | 12/2007 | Morita et al. | |
| 7,316,792 B2 | 1/2008 | Kosuzu et al. | |
| 7,615,314 B2 | 11/2009 | Kawakami et al. | |
| 7,670,970 B2 | 3/2010 | Ko | |
| 8,603,683 B2 | 12/2013 | Park et al. | |
| 8,709,653 B2 | 4/2014 | Lee et al. | |
| 9,178,208 B2 | 11/2015 | Park et al. | |
| 9,397,338 B2 | 7/2016 | Park et al. | |
| 9,553,303 B2 | 1/2017 | Park et al. | |
| 9,583,757 B2 | 2/2017 | Park et al. | |
| 9,620,809 B2 | 4/2017 | Turon Teixidor et al. | |
| 9,647,259 B2 | 5/2017 | Park et al. | |
| 9,806,328 B2 | 10/2017 | Park et al. | |
| 9,941,509 B2 | 4/2018 | Park et al. | |
| 9,997,765 B2 | 6/2018 | Park | |
| 10,103,378 B2 | 10/2018 | Park et al. | |
| 10,388,943 B2 | 8/2019 | Bonhomme et al. | |
| 10,431,808 B2 | 10/2019 | Park et al. | |
| 10,461,366 B1 | 10/2019 | Anderson et al. | |
| 2004/0137327 A1 | 7/2004 | Gross et al. | |
| 2005/0266304 A1 | 12/2005 | Honda et al. | |
| 2006/0035149 A1 | 2/2006 | Nanba | |
| 2006/0040182 A1 | 2/2006 | Kawakami et al. | |
| 2006/0051670 A1 | 3/2006 | Aramata et al. | |
| 2006/0051675 A1 | 3/2006 | Musha et al. | |
| 2006/0127773 A1 | 6/2006 | Kawakami et al. | |
| 2006/0134516 A1 | 6/2006 | Im et al. | |
| 2006/0147802 A1 | 7/2006 | Yasuda et al. | |
| 2006/0148191 A1* | 7/2006 | Mitchell ................ H01G 9/016 438/396 |
| 2006/0275668 A1 | 12/2006 | Peres et al. | |
| 2007/0054190 A1 | 3/2007 | Fukui et al. | |
| 2007/0054193 A1 | 3/2007 | Ota | |
| 2007/0072084 A1 | 3/2007 | Mishie Katsushi et al. | |
| 2007/0077490 A1 | 4/2007 | Kim et al. | |
| 2007/0154811 A1 | 7/2007 | Oh et al. | |
| 2007/0212610 A1 | 9/2007 | Sonobe et al. | |
| 2007/0243469 A1 | 10/2007 | Kim et al. | |
| 2008/0020282 A1 | 1/2008 | Kim et al. | |
| 2008/0145757 A1 | 6/2008 | Mah et al. | |
| 2008/0145761 A1 | 6/2008 | Petrat et al. | |
| 2008/0160409 A1 | 7/2008 | Ishida et al. | |
| 2008/0280207 A1 | 11/2008 | Patoux et al. | |
| 2008/0286657 A1 | 11/2008 | Hasegawa et al. | |
| 2009/0004566 A1 | 1/2009 | Shirane et al. | |
| 2009/0023065 A1 | 1/2009 | Hwang | |
| 2009/0029256 A1 | 1/2009 | Mah et al. | |
| 2009/0053608 A1 | 2/2009 | Choi et al. | |
| 2009/0061319 A1 | 3/2009 | Kim et al. | |
| 2009/0087743 A1 | 4/2009 | Kim et al. | |
| 2009/0117467 A1 | 5/2009 | Zhamu et al. | |
| 2009/0117468 A1 | 5/2009 | Eom | |
| 2009/0181304 A1 | 7/2009 | Miyamoto et al. | |
| 2009/0202911 A1 | 8/2009 | Fukuoka et al. | |
| 2009/0246632 A1 | 10/2009 | Fukui et al. | |
| 2009/0269667 A1 | 10/2009 | Antonietti et al. | |
| 2009/0280414 A1 | 11/2009 | Koh et al. | |
| 2009/0283875 A1 | 11/2009 | Garandet et al. | |
| 2009/0325072 A1 | 12/2009 | Maeda et al. | |
| 2010/0015530 A1 | 1/2010 | Katayama et al. | |
| 2010/0068628 A1 | 3/2010 | Ueda | |
| 2010/0078599 A1 | 4/2010 | Kumta et al. | |
| 2010/0119955 A1 | 5/2010 | Abe et al. | |
| 2010/0143798 A1 | 6/2010 | Zhamu et al. | |
| 2010/0216027 A1 | 8/2010 | Fujii | |
| 2010/0233534 A1 | 9/2010 | Iwama et al. | |
| 2010/0255376 A1 | 10/2010 | Park et al. | |
| 2010/0285352 A1 | 11/2010 | Juzkow et al. | |
| 2010/0297497 A1 | 11/2010 | Takahata | |
| 2011/0020701 A1 | 1/2011 | Park et al. | |
| 2011/0206974 A1 | 8/2011 | Inoue et al. | |
| 2011/0236761 A1 | 9/2011 | Endo et al. | |
| 2012/0156562 A1 | 6/2012 | Kobayashi et al. | |
| 2013/0202960 A1 | 8/2013 | Kim | |
| 2014/0057170 A1* | 2/2014 | Cha ...................... H01M 4/134 429/217 |
| 2014/0170451 A1 | 6/2014 | Iwasaki et al. | |
| 2014/0170498 A1 | 6/2014 | Park | |
| 2015/0010830 A1 | 1/2015 | Park et al. | |
| 2015/0137822 A1 | 5/2015 | Joe et al. | |
| 2016/0359164 A1 | 12/2016 | Mui et al. | |
| 2017/0040598 A1 | 2/2017 | Wang et al. | |
| 2017/0133664 A1 | 5/2017 | Park | |
| 2017/0133665 A1 | 5/2017 | Park | |
| 2017/0155126 A1 | 6/2017 | Park | |
| 2017/0170510 A1 | 6/2017 | Turon Teixidor et al. | |
| 2017/0279093 A1 | 9/2017 | Park | |
| 2018/0062154 A1 | 3/2018 | Park et al. | |
| 2018/0198114 A1 | 7/2018 | Bonhomme et al. | |
| 2018/0219211 A1 | 8/2018 | Park et al. | |
| 2018/0226642 A1 | 8/2018 | Wang et al. | |
| 2018/0287129 A1 | 10/2018 | Park | |
| 2019/0178944 A1 | 6/2019 | Rango et al. | |
| 2019/0181426 A1 | 6/2019 | Park et al. | |
| 2019/0181431 A1 | 6/2019 | Canton | |
| 2019/0181434 A1 | 6/2019 | Lee et al. | |
| 2019/0181440 A1 | 6/2019 | Park et al. | |
| 2019/0181441 A1 | 6/2019 | Ji et al. | |
| 2019/0181491 A1 | 6/2019 | Park et al. | |
| 2019/0181500 A1 | 6/2019 | Ji et al. | |
| 2019/0181501 A1 | 6/2019 | Ji et al. | |
| 2019/0181502 A1 | 6/2019 | Ji et al. | |
| 2019/0190069 A1 | 6/2019 | Ji et al. | |

(56) References Cited

U.S. PATENT DOCUMENTS

2019/0190070 A1 6/2019 Ji et al.
2019/0355966 A1 11/2019 Kamath et al.

FOREIGN PATENT DOCUMENTS

| | | |
|---|---|---|
| EP | 0 949 702 | 10/1999 |
| EP | 1 054 462 | 11/2000 |
| EP | 1 722 429 | 11/2006 |
| EP | 2 113 955 | 11/2009 |
| EP | 2 400 583 | 12/2011 |
| EP | 3 382 776 | 10/2018 |
| GB | 2 483 372 | 3/2012 |
| JP | 2000-106218 | 4/2000 |
| JP | 2000-133274 | 5/2000 |
| JP | 2000-173667 | 6/2000 |
| JP | 2000-272911 | 10/2000 |
| JP | 2001-006682 | 1/2001 |
| JP | 2002-151157 | 5/2002 |
| JP | 2002-246013 | 8/2002 |
| JP | 2002-367601 | 12/2002 |
| JP | 2003-165715 | 6/2003 |
| JP | 2004-006285 | 1/2004 |
| JP | 2004-095198 | 3/2004 |
| JP | 2004-103405 | 4/2004 |
| JP | 2004-327319 | 11/2004 |
| JP | 2005-158721 | 6/2005 |
| JP | 2007-073334 | 3/2007 |
| JP | 2007-123141 | 5/2007 |
| JP | 2007-165061 | 6/2007 |
| JP | 2007-531245 | 11/2007 |
| JP | 2008-153006 | 7/2008 |
| JP | 2009-026760 | 2/2009 |
| JP | 2009-037842 | 2/2009 |
| JP | 2009-176540 | 8/2009 |
| JP | 2010-146901 | 7/2010 |
| JP | 2012-014866 | 1/2012 |
| JP | 2012-028322 | 2/2012 |
| JP | 2012-527085 | 11/2012 |
| JP | 2012-252962 | 12/2012 |
| JP | 2013-045759 | 3/2013 |
| JP | 2017-107851 | 6/2017 |
| KR | 2001-0081928 | 8/2001 |
| KR | 2009-0109225 | 10/2009 |
| WO | WO 98/028804 | 7/1998 |
| WO | WO 2010/092977 | 8/2010 |
| WO | WO 2011/088472 | 7/2011 |
| WO | WO 2012/050407 | 4/2012 |
| WO | WO 2014/163986 | 10/2014 |
| WO | WO 2019/113340 | 6/2019 |
| WO | WO 2019/113346 | 6/2019 |
| WO | WO 2019/113349 | 6/2019 |

OTHER PUBLICATIONS

Cui et al., "Inorganic Glue Enabling High Performance of Silicon Particles as Lithium Ion Battery Anode", Journal of the Electrochemical Society, 2011, vol. 158, No. 5, A592-A596.

Datta, et al., "Silicon, Graphite and Resin Based Hard Carbon Nanocomposite Anodes for Lithium Ion Batteries", Journal of Power Sources, Feb. 10, 2007, vol. 165, No. 1, pp. 368-378.

Du et al., "Electrochemistry of $Cu_xSi_{1-x}$ Alloys in Li Cells", Journal of the Electrochemical Society, 2016, vol. 163, No. 7, pp. A1275-A1279.

International Search Report and Written Opinion for International Application No. PCT/US2014/019669, dated Aug. 28, 2014 in 13 pages.

International Preliminary Report on Patentability and Written Opinion for International Application No. PCT/US2014/019669, dated Sep. 24, 2015 in 10 pages.

Ji et al., "Electrospun Carbon Nanofibers Containing Silicon Particles as an Energy-Storage Medium", Carbon, Nov. 2009, vol. 47, No. 14, pp. 3219-3226.

Lee et al., "Graphene-Silicon Composite for Li-Ion Battery Anodes", http://apps.aiche.org/proceedings/Abstracts.aspx?PaperID=162914, dated Sep. 11, 2009 [Retrieved Jun. 23, 2011].

Lee et al., "Silicon Nanoparticles-Graphene Paper Composites for Li ion Battery Anodes", Chemical Communications, 2010, vol. 46, No. 12, pp. 2025-2027.

Li et al., "Copper Deposition and Thermal Stability Issues in Copper-Based Metallization for ULSI Technology", Materials Science Reports, vol. 9, No. 1, 1992, pp. 1-51.

Ludwig et al., "Solvent-Free Manufacturing of Electrodes for Lithium-ion Batteries", Scientific Reports, Mar. 17, 2016, 6:23150, pp. 1-10.

Ma et al., "Si-Based Anode Materials for Li-Ion Batteries: A Mini Review", Nano-Micro Letters, 2014, vol. 6, No. 4, pp. 347-358.

Mazouzi et al., "Very High Surface Capacity Observed Using Si Negative Electrodes Embedded in Copper Foam as 3D Current Collectors", Advanced Energy Materials, 2014, vol. 4, 1301718, pp. 1-13.

Sufryd et al., "Experimental investigation of the Cu—Si phase diagram at x(Cu)>0.72", Intermetallics, 2011, vol. 19, pp. 1479-1488.

Wolf, H. et al., "Carbon-Fiber-Silicon Nanocomposites for Lithium-Ion Battery Anodes by Microwave Plasma Chemical Vapor Deposition", Journal of Power Sources, May 1, 2009, vol. 190, No. 1, pp. 157-161.

International Search Report and Written Opinion for International Application No. PCT/US2018/064295, dated Feb. 12, 2019 in 12 pages.

Gao et al., "Engineered Si Sandwich Electrode: Si Nanoparticles/Graphite Sheet Hybrid on Ni Foam for Next-Generation High-Performance Lithium-Ion Batteries", ACS Applied Materials & Interfaces, 2015, vol. 7, No. 3, pp. 1693-1698.

Kamali et al., "Review on Carbon and Silicon Based Materials as Anode Materials for Lithium Ion Batteries", Journal of New Materials for Electrochemical Systems, 2010, vol. 13, pp. 147-160.

* cited by examiner

SANDWICH ELECTRODES AND METHODS OF MAKING THE SAME

CROSS-REFERENCE TO RELATED APPLICATIONS

This application claims the benefit of U.S. Provisional Application No. 62/596,019, filed Dec. 7, 2017. The entirety of the above referenced application is hereby incorporated by reference.

BACKGROUND

Field

The present disclosure relates to electrochemical cells and electrodes used in electrochemical cells. In particular, the present disclosure relates to sandwich electrodes and sandwich electrodes used in electrochemical cells. The electrodes and electrochemical cells can include silicon and carbon composite materials for use in batteries, such as lithium ion batteries.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. For the cathode, separator and anode to be rolled, each sheet must be sufficiently deformable or flexible to be rolled without failures, such as cracks, brakes, mechanical failures, etc. Typical electrodes include electro-chemically active material layers on electrically conductive metals (e.g., aluminum and copper). For example, carbon can be deposited onto a current collector along with an inactive binder material. Carbon is often used because it has excellent electrochemical properties and is also electrically conductive. Electrodes can be rolled or cut into pieces which are then layered into stacks. The stacks are of alternating electro-chemically active materials with the separator between them.

SUMMARY

Example electrodes are provided. The electrode can comprise a first conductive layer, a second conductive layer, and an electrochemically active layer. At least one of the first and second conductive layers can include porosity configured to allow an electrolyte to flow therethrough. The electrochemically active layer can include electrochemically active material sandwiched between the first and second conductive layers. The electrochemically active layer can be in electrical communication with the first and second conductive layers.

In various electrodes, the at least one of the first and second conductive layers can comprise foam, mesh, or perforated material. At least one of the first and second conductive layers can comprise metal. In some examples, at least one of the first and second conductive layers can comprise nickel foam or a perforated copper foil. In some examples, at least one of the first and second conductive layers can comprise carbon. In some instances, the at least one of the first and second conductive layers comprises both the first and second conductive layers.

In some electrodes, the electrochemically active layer can comprise silicon, germanium, tin, oxide, graphite, or a combination thereof. In some instances, the electrochemically active layer can comprise a film. For example, the film can comprise a silicon carbon composite film. In some instances, the electrochemically active layer can comprise at least about 50% to about 99% by weight of silicon. For example, the electrochemically active layer can comprise the silicon at about 60% to about 99% by weight, at about 70% to about 99% by weight, or at about 80% to about 99% by weight.

Some electrodes can further comprise an attachment substance between the electrochemically active layer and the first and/or second conductive layer. For example, the attachment substance can include polyamideimide, polyimide resin, polyacrylic acid, or a combination thereof.

Some electrodes can further comprise a third conductive layer and a second electrochemically active layer comprising electrochemically active material. The second electrochemically active layer can be sandwiched between the third conductive layer and the first or second conductive layer. In some instances, the electrochemically active layer and the second electrochemically active layer can comprise the same electrochemically active material. In various embodiments, the electrode can be a negative electrode.

Example electrochemical cells are also provided. The electrochemical cell can comprise any one of the example electrodes. The electrochemical cell can comprise a lithium ion battery.

Example methods of forming an electrode are provided. The method can comprise sandwiching at least one electrochemically active layer comprising electrochemically active material between a first conductive layer and a second conductive layer. At least one of the first and second conductive layers can include porosity configured to allow electrolyte to flow therethrough. The method can also comprise adhering the at least one electrochemically active layer to the first and second conductive layers such that the at least one electrochemically active layer is in electrical communication with the first and second conductive layers.

Some methods can further comprise providing the first conductive layer with the at least one electrochemically active layer. The first conductive layer can be disposed on a first side of the at least one electrochemically active layer. Sandwiching can comprise disposing the second conductive layer on a second side of the at least one electrochemically active layer.

Some methods can further comprise providing the first conductive layer where a first electrochemically active layer can be provided with the first conductive layer, and providing the second conductive layer where a second electrochemically active layer can be provided with the second conductive layer. Adhering can comprise adhering the first and second electrochemically active layers to form the at least one electrochemically active layer sandwiched between the first and second conductive layers. In some instances, the first and second electrochemically active layers can form a single electrochemically active layer.

In some methods, adhering can comprise providing an adhesive layer between the at least one electrochemically active layer and the first and/or second conductive layer. In some methods, adhering can comprise applying pressure to the at least one electrochemically active layer to adhere the at least one electrochemically active layer to the first and second conductive layers. In some methods, adhering can comprise applying heat to the at least one electrochemically active layer to adhere the at least one electrochemically active layer to the first and second conductive layers.

Some methods can further comprise punching the first conductive layer, the second conductive layer, and the at least one electrochemically active layer. In some instances, the method can further comprise applying heat to the at least one electrochemically active layer to sinter the at least one electrochemically active layer to the first and second conductive layers.

Some methods can further comprise sandwiching at least one second electrochemically active layer comprising electrochemically active material between a third conductive layer and the first or second conductive layer, and adhering the at least one second electrochemically active layer to the third conductive layer and the first or second conductive layer such that the at least one second electrochemically active layer can be in electrical communication with the third conductive layer and the first or second conductive layer. In some instances, adhering the at least one electrochemically active layer and adhering the at least one second electrochemically active layer can occur simultaneously.

In some methods, the at least one of the first and second conductive layers can comprise foam, mesh, or perforated material. In some instances, at least one of the first and second conductive layers can comprise metal. In some instances, at least one of the first and second conductive layers can comprise carbon.

In some methods, the at least one electrochemically active layer can comprise silicon, germanium, tin, oxide, graphite, or a combination thereof. In some instances, the at least one electrochemically active layer can comprise a silicon carbon composite film. In some instances, the electrochemically active layer can comprise at least about 50% to about 99% by weight of silicon. In some examples, the electrode can be a negative electrode.

DETAILED DESCRIPTION

Figure 1:
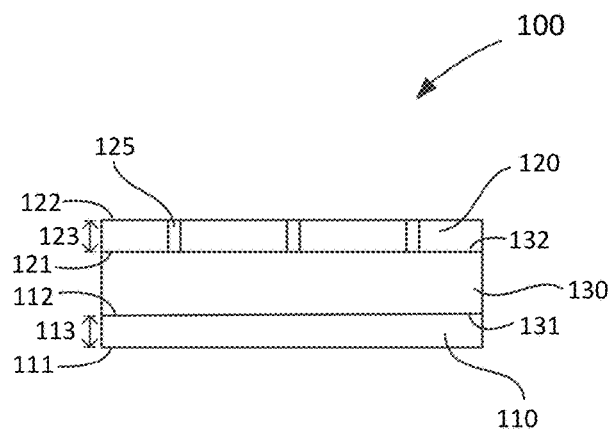
FIG. 1 schematically illustrates an example electrode in accordance with certain embodiments described herein.

Certain embodiments of electrodes (e.g., anodes and cathodes) and electrochemical cells are described. The electrodes and electrochemical cells can include a composite material comprising electrochemically active material. In some embodiments, the composite material may include carbonized polymer and silicon material. For example, a mixture that includes a carbon precursor and a silicon material can be formed into a composite material. This mixture can include both carbon and silicon and thus can be referred to as a carbon-silicon composite material, a silicon-carbon composite material, a carbon composite material, or a silicon composite material.

Typical carbon anode electrodes include a current collector such as a copper sheet. Carbon is deposited onto the collector along with an inactive binder material. Carbon is often used because it has excellent electrochemical properties and is also electrically conductive. Anode electrodes used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical specific capacity of 372 milliamp hours per gram (mAh/g). In comparison, silicon has a high theoretical capacity of 4200 mAh/g. Silicon, however, swells in excess of 300% upon lithiation. Because of this expansion, anodes including silicon may expand/contract and lose electrical contact to the rest of the anode. Accordingly, batteries with silicon anodes exhibit more rapid capacity loss upon cycling than those batteries with graphite anodes. The repeated expansion and contraction of silicon particles during charge and discharge can lead to mechanical failure of the anode, including disconnection between silicon and carbon, silicon and current collectors, as well as the disconnection between silicon particles. Therefore, a silicon anode should be designed to be able to expand while maintaining good electrical contact with the rest of the electrode.

Currently in a typical electrode design, silicon containing anodes have free surfaces that expand and shrink during cycling. Once the silicon particles are pulverized, they can be isolated from the actively functioning anode to become "dead." In certain embodiments, the silicon particles can be retained in the electrode by incorporating a conductive layer with porosity. The conductive layer with porosity can allow both electron and ion transport in addition to mechanical confinement, e.g., to mitigate pulverization of silicon particles. For example, certain embodiments can include an additional conductive layer to sandwich the electrochemically active material. This can reduce (and/or prevent in some instances) material that cracks or pulverizes from losing electrical contact to the current collector. In addition, by including porosity, electrolyte can flow through a conductive skeleton.

FIG. 1 schematically illustrates an example electrode in accordance with certain embodiments described herein. The electrode 100 can be used as a negative electrode (i.e., an anode), a positive electrode (i.e., a cathode), or both. Various embodiments of the electrode 100 can be used in an electrochemical cell. The electrode 100 can be used in either secondary batteries (e.g., rechargeable) or primary batteries (e.g., non-rechargeable). The electrochemical cell can include a lithium ion battery.

With continued reference to FIG. 1, the example electrode 100 can include a first conductive layer 110 and a second conductive layer 120. At least one of the first 110 and second 120 conductive layers can include porosity 125 configured to allow electrolyte to flow therethrough (e.g., one or more pathways). The electrode 100 can also include an electrochemically active layer 130 comprising electrochemically active material sandwiched between the first 110 and second 120 conductive layers. The electrochemically active layer 130 can be in electrically communication with the first 110 and second 120 conductive layers. In various embodiments, a sandwich electrode 100 can be formed such that the electrochemically active layer 130 is confined between the first 110 and second 120 conductive layers, yet can allow electrolyte to flow through the porosity 125 in the first 110 and/or second 120 conductive layer.

In some embodiments, the first conductive layer 110 and/or second conductive layer 120 can act as a current collector. The first conductive layer 110 and/or second conductive layer 120 can include any current collector material known in the art or yet to be developed. The first conductive layer 110 can include the same or different material as the second conductive layer 120. In some embodiments, the first conductive layer 110 and/or second conductive layer 120 can include a metal. Example metals include, but are not limited to, copper, nickel, iron, titanium, molybdenum, stainless steel, chromium, aluminum, or a combination thereof. In some instances, copper and/or nickel can be used for an anode, and aluminum can be used for a cathode. In some embodiments, the first 110 and/or second 120 conductive layer can include non-metallic materials. An example non-metallic conductive material includes carbon, indium tin oxide (ITO), silicon carbide, or a combination thereof.

The first conductive layer 110 and/or second conductive layer 120 can have two sides (e.g., two opposite major surfaces) and a thickness therebetween. For example, the first conductive layer 110 can have a first side 111, a second side 112, and a thickness 113. Likewise, the second conductive layer 120 can have a first side 121, a second side 122, and a thickness 123. The shape and/or size of the first conductive layer 110 can be the same as or different from the shape and/or size of the second conductive layer 120. For example, the length of the first side 111 and/or second side 112 of the first conductive layer 110 can be the same as or different from the length of the first side 121 and/or second side 122 of the second conductive layer 120. As another example, the thickness 113 of the first conductive layer 110 can be the same as or different from the thickness 123 of the second conductive layer 120. In some embodiments, the first conductive layer 110 and/or second conductive layer 120 can include a sheet or foil.

In FIG. 1, the second conductive layer 120 is illustrated as having porosity 125 such that the second conductive layer 120 can be an electrolyte-penetrable conductive layer. For simplicity, porosity 125 is described herein in terms of the second conductive layer 120. However, it is appreciated that in some instances, the first conductive layer 110 can have porosity such that the first conductive layer 110 can be an electrolyte-penetrable conductive layer instead of or in addition to the second conductive layer 120. In some embodiments, the first conductive layer 110 and second conductive layer 120 can include porosity and can act as a current collector such that no other conductive layers may be needed. For example, the electrochemically active material layer can have an electrolyte-penetrable conductive layer on one side and another electrolyte-penetrable conductive layer on the other side of the active material layer.

In various embodiments, the porosity 125 can include one or more pathways that begin at the first side 121 and end at the second side 122 of the conductive layer 120 (e.g., providing a passage for electrolyte to flow through the conductive layer 120). In some instances, the porosity 125 can include a direct path, while in some other instances, the porosity 125 can include a tortuous path. At least one pathway of the porosity 125 can extend through the thickness 123 of the conductive layer 120. In some examples, at least one pathway of the porosity 125 can have a length substantially equal to the thickness 123 of the conductive layer 120. In some examples, at least one pathway of the porosity 125 can have a length greater than the thickness 123 of the conductive layer 120.

The size, shape, and frequency of the porosity 125 is not particularly limited but can be sized, shaped, and spaced apart to allow sufficient electrolyte to flow therethrough, yet not allow the active particles to flow therethrough. In some instances, the porosity 125 can be spaced apart from other porosity 125 by about 1 mm or less, or in a range from about 0.1 mm to about 1 mm (e.g., about 0.1 mm, about 0.2 mm, about 0.3 mm, about 0.4 mm, about 0.5 mm, about 0.6 mm, about 0.7 mm, about 0.75 mm, about 0.8 mm, about 0.9 mm, or about 1 mm), or in a range within this range such as any range formed by the example values (e.g., from about 0.2 mm to about 1 mm, from about 0.3 mm to about 1 mm, from about 0.5 mm to about 1 mm, from about 0.1 mm to about 0.9 mm, from about 0.2 mm to about 0.9 mm, from about 0.5 mm to about 0.9 mm, from about 0.1 mm to about 0.8 mm, from about 0.2 mm to about 0.8 mm, from about 0.5 mm to about 0.8 mm, from about 0.1 mm to about 0.75 mm, from about 0.2 mm to about 0.75 mm, from about 0.5 mm to about 0.75 mm, from about 0.1 mm to about 0.5 mm, from about 0.2 mm to about 0.5 mm, etc.). In some instances, the size of the porosity 125 can be smaller than the size of the active material. In some embodiments, the average porosity size (or the average diameter or the average largest dimension) or the median porosity size (or the median diameter or the median largest dimension) can be less than about 50 μm, less than about 40 μm, less than about 30 μm, less than about 20 μm, less than about 10 μm, less than about 1 μm, between about 10 nm and about 50 μm, between about 10 nm and about 40 μm, between about 10 nm and about 30 μm, between about 10 nm and about 20 μm, between about 0.1 μm and about 20 μm, between about 0.5 μm and about 20 μm, between about 1 μm and about 20 μm, between about 1 μm and about 15 μm, between about 1 μm and about 10 μm, between about 10 nm and about 10 μm, between about 10 nm and about 1 μm, less than about 500 nm, less than about 100 nm, and about 100 nm. In some embodiments, the porosity 125 can be formed by one or more pores or interconnected pores in the conductive layer 120.

In various embodiments, the first conductive layer 110 and/or second conductive layer 120 can include foam, mesh (e.g., woven or non-woven), or perforated material. As an example, the first conductive layer 110 and/or second conductive layer 120 can include nickel foam. As another example, the first conductive layer 110 and/or second conductive layer 120 can include a perforated copper foil. As another example, the first conductive layer 110 and/or second conductive layer 120 can include carbon foam, carbon mesh, porous carbon, perforated carbon film, etc.

With continued reference to FIG. 1, the electrochemically active layer 130 sandwiched between the first conductive layer 110 and second conductive layer 120 can be in electrically communication with the first conductive layer 110 and second conductive layer 120. For example, the electrochemically active layer 130 can have a first side 131 and a second side 132. The first side 131 of the electrochemically active layer 130 can be positioned adjacent the second side 112 of the first conductive layer 110. The second side 132 of the electrochemically active layer 130 can be positioned adjacent the first side 121 of the second conductive layer 120.

The electrochemically active layer 130 can include electrochemically active material. The electrochemically active material can include any electrochemically active material. For example, the electrochemically active material can include silicon, germanium, tin, oxide, graphite, or a combination thereof. As additional examples, the electrochemically active material can include higher-voltage active materials such as lithium cobalt oxide, lithium cobalt aluminum oxide, various forms of lithium nickel manganese cobalt oxide (NMC), various forms of lithium manganese oxide (LMO), etc. As described herein, various embodiments can include a silicon-carbon (or carbon-silicon) composite material. U.S. patent application Ser. No. 13/008,800, filed Jan. 18, 2011, and published on Jul. 21, 2011 as U.S. Patent Application Publication No. 2011/0177393, entitled "Composite Materials for Electrochemical Storage;" U.S. patent application Ser. No. 13/601,976, filed Aug. 31, 2012, and published on Jun. 19, 2014 as U.S. Patent Application Publication No. 2014/0170498, entitled "Silicon Particles for Battery Electrodes;" and U.S. patent application Ser. No. 13/799,405, filed Mar. 13, 2013, and published on Jun. 19, 2014 as U.S. Patent Application Publication No. 2014/0166939, entitled "Silicon Particles for Battery Electrodes," each of which is incorporated by reference herein, describe certain embodiments of carbon-silicon composite materials using carbonized polymer and silicon material. In various embodiments, the electrochemically active layer 130 can include a film, e.g., a silicon-carbon composite film.

In some embodiments, the electrochemically active layer 130 can include from greater than 0% to about 99% by weight of electrochemically active material. For example, the amount of electrochemically active material by weight of the electrochemically active layer 130 can include any weight percent within this range (e.g., about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, etc.), or any range within this range such as any range formed by the example values (e.g., greater than about 0% to about 25% by weight, greater than about 0% to about 35% by weight, greater than about 0% to about 50% by weight, greater than about 0% to about 70% by weight, greater than about 0% to about 90% by weight, greater than about 0% to about 95% by weight, from about 10% to about 35% by weight, from about 10% to about 50% by weight, from about 10% to about 90% by weight, from about 10% to about 95% by weight, from about 10% to about 99% by weight, from about 30% to about 85% by weight, from about 30% to about 90% by weight, from about 30% to about 95% by weight, from about 30% to about 99% by weight, from about 50% to about 85% by weight, from about 50% to about 90% by weight, from about 50% to about 95% by weight, from about 50% to about 99% by weight, from about 60% to about 85% by weight, from about 60% to about 90% by weight, from about 60% to about 95% by weight, from about 60% to about 99% by weight, from about 70% to about 85% by weight, from about 70% to about 90% by weight, from about 70% to about 95% by weight, from about 70% to about 99% by weight, from about 80% to about 90% by weight, from about 80% to about 95% by weight, from about 80% to about 99% by weight, etc.).

In some embodiments, the electrode 100 can include an attachment substance (not shown) between the electrochemically active layer 130 and the first 110 and/or second 120 conductive layer. An attachment (e.g., adhesive) substance can be used to couple or adhere the electrochemically active layer 130 to the first 110 and/or second 120 conductive layer (e.g., to prevent delamination between them).

The attachment substance can include any attachment substance such as an attachment substance as described in U.S. patent application Ser. No. 13/333,864, filed Dec. 21, 2011, and published on Jun. 19, 2014 as U.S. Patent Application Publication No. 2014/0170482, entitled "Electrodes, Electrochemical Cells, and Methods of Forming Electrodes and Electrochemical Cells," or U.S. patent application Ser. No. 13/796,922, filed Mar. 12, 2013, and published on Jun. 19, 2014 as U.S. Patent Application Publication No. 2014/0170475, entitled "Electrodes, Electrochemical Cells, and Methods of Forming Electrodes and Electrochemical Cells," each of which is incorporated by reference herein. In some embodiments, the attachment substance can be substantially electrically nonconductive (e.g., the attachment substance has an electrically conductivity such that, in use of the adhesive substance in an electrochemical cell, the attachment substance does not conduct electricity). In some instances, portions of the electrochemically active layer 130 may penetrate the layer of attachment substance and come in direct contact (e.g., physical contact) with the first 110 and/or second 120 conductive layer (e.g., allowing electrons to travel directly from the electrochemically active layer 130 to the first 110 and/or second 120 conductive layer).

The attachment substance may be a polymer. In certain embodiments, the attachment substance includes polyamideimide (PAI) or is PAI. In some embodiments, the attachment substance includes polyimide resin or is polyimide resin. In further embodiments, the attachment substance includes polyvinylidene fluoride (PVDF) or is PVDF, includes carboxymethyl cellulose (CMC) or is CMC, or includes polyacrylic acid (PAA) or is PAA. The attachment substance may also be other materials that provide sufficient adhesion (e.g., bonding strength) to both electrochemically active layer 130 and the first 110 and/or second 120 conductive layer. Additional examples of chemicals that can be or be included in the attachment substance include styrene butadiene rubber (SBR), polypyrrole (PPy), poly(vinylidene fluoride)-tetrafluoroethylene-propylene (PVDF-TFE-P), polyacrylonitrile, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethylmethacrylate, polymethacrylic acid, nitrile-butadiene rubber, polystyrene, polycarbonate, and a copolymer of vinylidene fluoride and hexafluoro propylene. The attachment substance may be a thermoset polymer or a thermoplastic polymer, and the polymer may be amorphous, semi-crystalline, or crystalline.

Figure 2A:
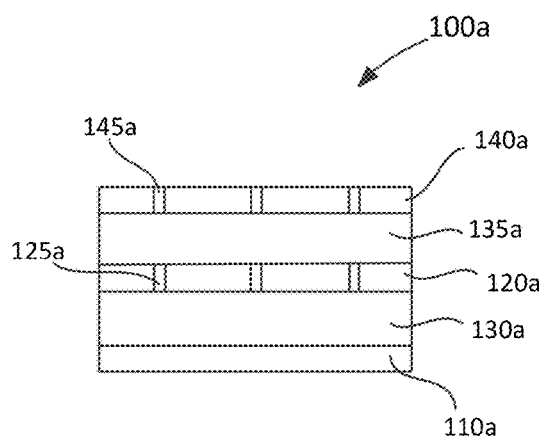
FIGS. 2a and 2b schematically illustrate additional example electrodes in accordance with certain embodiments described herein.
Figure 2B:
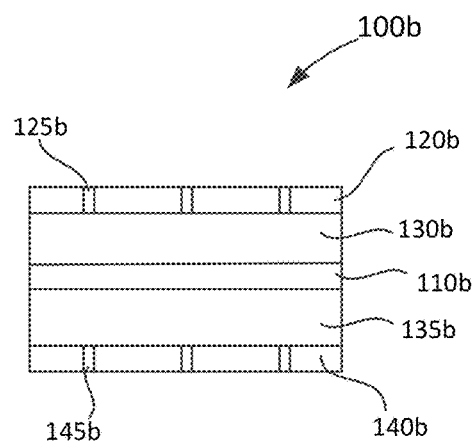

FIGS. 2a and 2b schematically illustrate additional example electrodes in accordance with certain embodiments described herein. In FIG. 2a, the example electrode 100a includes a third conductive layer 140a and a second electrochemically active layer 135a. The third conductive layer 140a is positioned such that the second electrochemically active layer 135a is sandwiched between the third conductive layer 140a and second conductive layer 120a. In FIG. 2b, the third conductive layer 140b is positioned such that the second electrochemically active layer 135b is sandwiched between the third conductive layer 140b and first conductive layers 110b. The third conductive layer 140a, 140b may or may not include porosity 145a, 145b to allow electrolyte to flow therethrough. For example, the third conductive layer 140a, 140b may or may not include porosity 145a, 145b, e.g., depending on whether the second conductive layer 120a and/or first conductive layer 110b has porosity. In various embodiments, one, two, or all three of the conductive layers can have porosity configured to allow electrolyte to flow therethrough.

It is appreciated that the third conductive layer 140a, 140b may include the same or different material as the first 110a, 110b and/or second 120a, 120b conductive layer. In addition, the second electrochemically active layer 135a, 135b may include the same or different material as the first electrochemically active layer 130a, 130b. For example, the second electrochemically active layer 135a, 135b may include the same or different electrochemically active material as the first electrochemically active layer 130a, 130b. Furthermore, some electrodes can include additional conductive layers (e.g., four, five, six, etc.) and/or additional electrochemically active layers (e.g., three, four, five, six, etc.).

Figure 3:
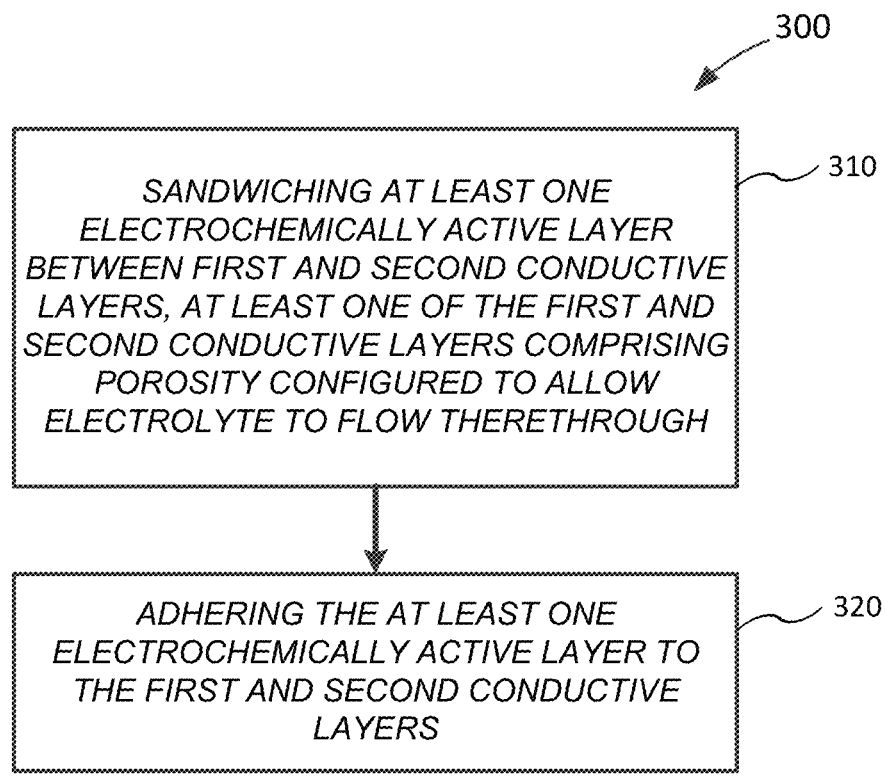
FIG. 3 illustrates an example method of forming an electrode in accordance with certain embodiments described herein.

FIG. 3 illustrates an example method of forming an electrode (e.g., the electrode 100 schematically illustrated in FIG. 1). As shown in block 310, the method 300 of forming an electrode can include sandwiching at least one electrochemically active layer between first and second conductive layers. The electrochemically active layer can include electrochemically active material. At least one of the first and second conductive layers can comprise porosity configured to allow electrolyte to flow therethrough.

As shown in block 320, the method 300 of forming an electrode can include adhering the electrochemically active layer to the first and second conductive layers, for example, such that the electrochemically active layer is in electrical communication with the first and second conductive layers.

With reference to block 310, one embodiment of the electrochemically active layer may be, for example, the electrochemically active layer 130 in FIG. 1. The electrochemically active layer can include electrochemically active material (e.g., any electrochemically active material described herein). The first and/or second conductive layer can include any conductive layer described herein (e.g., first 110 conductive layer and/or second conductive layer 120 in FIG. 1, etc.). The first and/or second conductive layer can include porosity 125 configured to allow electrolyte to flow therethrough (e.g., porosity 125 in FIG. 1).

With reference to FIG. 1, in some embodiments, the first conductive layer 110 can be provided with the electrochemically active layer 130. For example, the first conductive layer 110 can be disposed on a first side 131 of the electrochemically active layer 130. Sandwiching can include disposing the second conductive layer 120 on a second side 132 of the electrochemically active layer 130. For example, in some embodiments, the electrochemically active layer can be coated on a current collector and an electrolyte-penetrable conductive layer can be adhered on the other side of the electrochemically active layer 130 to form the sandwich electrode.

In some embodiments, two layers of electrolyte-penetrable conductive layers can surround an electrochemically active layer. The electrolyte-penetrable conductive layers can act as current collectors such that no other conductive layer may be needed. In some such embodiments, the electrochemically active layer can be coated on an electrolyte-penetrable layer, and another electrolyte-penetrable layer can be adhered on the other side.

In some embodiments, the first 110 and second 120 conductive layers can be provided with a first and second electrochemically active material respectively. The method 300 of forming can include adhering the first and second electrochemically active material together to form the electrochemically active layer 130 sandwiched between the first 110 and second 120 conductively layers. In some instances, the first and second electrochemically active material can form a single electrochemically active layer 130.

In some embodiments, the electrochemically active layer 130 can be adhered to the first 110 and/or second 120 conductive layer by providing an adhesive layer (e.g., attachment substance) between the electrochemically active layer 130 and the first 110 and/or second 120 conductive layer.

The attachment substance can be applied between the electrochemically active layer 130 and the first 110 and/or second 120 conductive layer using any method known in the art or yet to be developed. For example, the attachment substance can be applied using a solution (e.g., a wet process) as described in U.S. patent application Ser. No. 13/333,864, filed Dec. 21, 2011, and published on Jun. 19, 2014 as U.S. Patent Application Publication No. 2014/0170482, entitled "Electrodes, Electrochemical Cells, and Methods of Forming Electrodes and Electrochemical Cells," which is incorporated by reference herein. As another example, the attachment substance can be applied using an attachment substance in a substantially solid state (e.g., a substantially dry process) as described in U.S. patent application Ser. No. 13/796,922, filed Mar. 12, 2013, and published on Jun. 19, 2014 as U.S. Patent Application Publication No. 2014/0170475, entitled "Electrodes, Electrochemical Cells, and Methods of Forming Electrodes and Electrochemical Cells," which is incorporated by reference herein. In various embodiments, the attachment substance does not block the porosity in the first 110 and/or second 120 conductive layers.

In some embodiments, additional adhesive materials can be used to improve the adhesion between the layers. In some embodiments, the electrochemically active layer 130 can be adhered to the first conductive layer 110 and/or second conductive layer 120 through mechanical adhesion.

In some examples, the electrochemically active layer 130 can be adhered to the first 110 conductive layer and/or second conductive layer 120 by applying an appropriate pressure and/or heat (e.g., temperature) to the electrochemically active layer 130. For example, a pressure from about 10 MPa to about 50 MPa (e.g., any pressure within this range such as about 10 MPa, about 15 MPa, about 20 MPa, about 25 MPa, about 30 MPa, 35 MPa, 40 MPa, 45 MPa, 50 MPa, etc.), or any range within this range (e.g., any range formed by the example values such as about 10 MPa to about 45 MPa, about 20 MPa to about 50 MPa, etc.) can be applied. As another example, a temperature from about 200° C. to about 350° C. (e.g., any temperature within this range such as about 200° C., about 225° C., about 250° C., about 275° C., about 300° C., about 325° C., about 350° C., etc.), or any range within this range (e.g., any range formed by the example values such as about 200° C. to about 325° C., etc.)

can be applied. In various embodiments, the applied temperature can be determined by the materials of any adhesives, the electrochemically active layer 130, and/or the conductive layers 110, 120. In some instances, applying heat can sinter the electrochemically active layer to the first 110 and/or second 120 conductive layer.

In various embodiments, after the sandwich electrode is formed into a single integrated piece, the electrode can be punched and processed. After the electrode is punched, the electrode can undergo heat treatment. In some embodiments, the heat treatment can enhance the adhesion between layers. For example, the punched sandwich electrodes can be annealed at high temperatures from about 500° C. to about 850° C. (e.g., any temperature within this range such as about 500° C., about 525° C., about 550° C., about 575° C., about 600° C., about 625° C., about 650° C., about 675° C., about 700° C., about 725° C., about 750° C., about 775° C., about 800° C., about 825° C., about 850° C., etc.) or any range within this range (e.g., any range formed by the example values such as about 500° C. to about 825° C., about 500° C. to about 800° C., etc.) to further sinter the layers together. In various embodiments, the applied temperature can be determined by the materials of the electrochemically active layer 130 and/or the conductive layers 110, 120.

Figure 4:
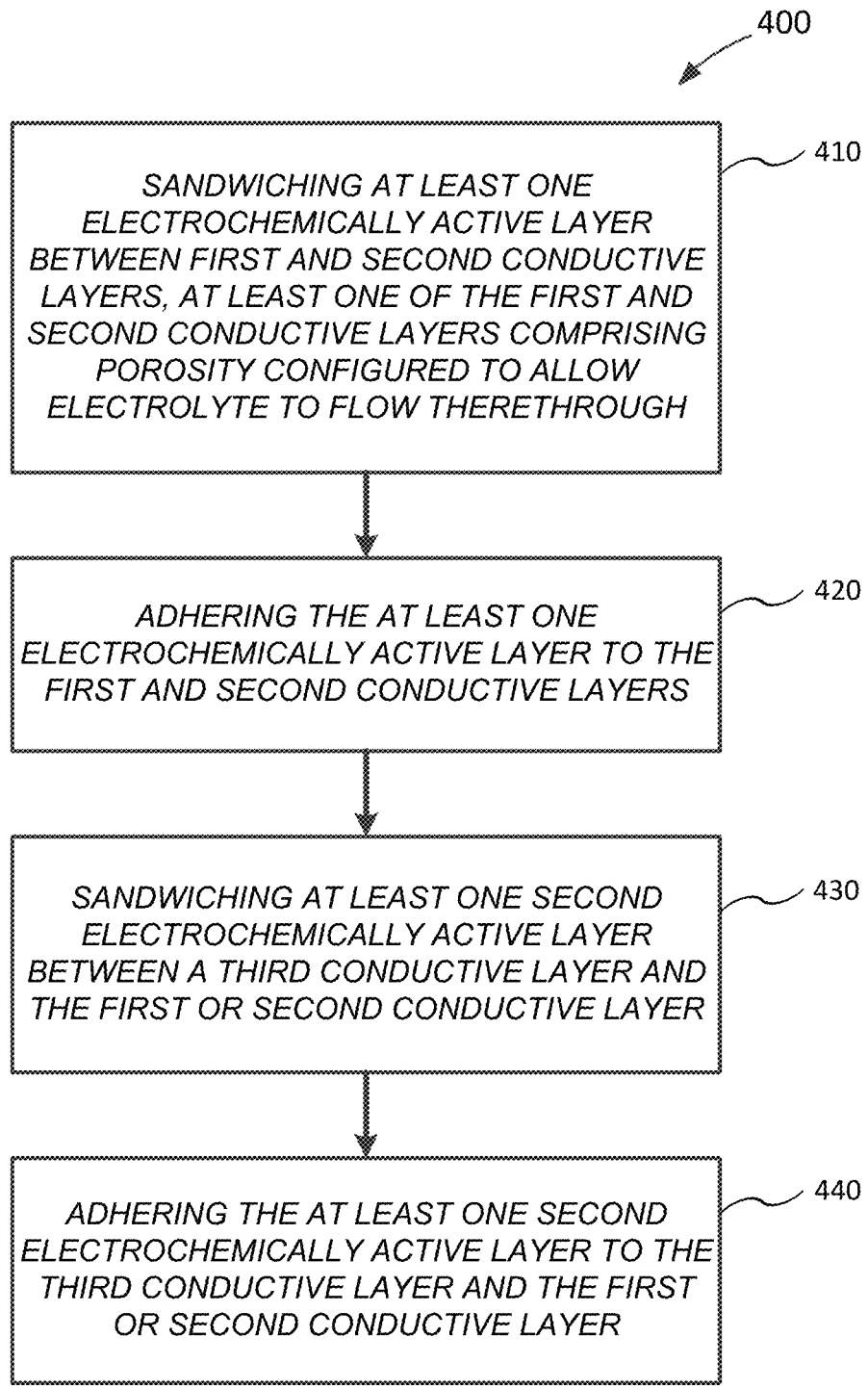
FIG. 4 illustrates another example method of forming an electrode in accordance with certain embodiments described herein.

FIG. 4 illustrates another example method 400 of forming an electrode (e.g., the electrode 100a, 100b schematically illustrated in FIGS. 2a and 2b). In some embodiments, the method 400 can include steps 410 and 420, which can be similar to steps 310 and 320 in method 300.

Following such steps, as shown in block 430 in FIG. 4, the method 400 of forming can include sandwiching at least one second electrochemically active layer between a third conductive layer and the first or second conductive layer. With reference to FIG. 2a, the second electrochemically active layer 135a can be sandwiched between the third 140a and second 120a conductive layers. With reference to FIG. 2b, the second electrochemically active layer 135b can be sandwiched between the third 140b and first 110b conductive layers.

In various embodiments, as shown in block 440, the method 400 of forming can include adhering at least one second electrochemically active layer to the third conductive layer and the first or second conductive layer, e.g., such that the second electrochemically active layer can be in electrical communication with the third conductive layer and the first or second conductive layer. With reference to FIG. 2a, the second electrochemically active layer 135a can be adhered to the third 140a and second 120a conductive layers. The second electrochemically active layer 135a can be in electrical communication with the third 140a and the second 120a conductive layers. With reference to FIG. 2b, the second electrochemically active layer 135b can be adhered to the third 140b and first 110b conductive layers. The second electrochemically active layer 135b can be in electrical communication with the third 140b and the first 110b conductive layers.

In some embodiments, adhering the first electrochemically active layer and adhering the second electrochemically active layer can occur sequentially. For example, with reference to FIG. 2a, in some embodiments, the first electrochemically active layer 130a can be adhered to the first 110a and second 110b conductive layers. Subsequently, the second electrochemically active layer 135a can be adhered to the third 140a and second 120a conductive layers.

In some embodiments, adhering the first electrochemically active layer and adhering the second electrochemically active layer can occur simultaneously. For example, with reference to FIG. 2b, in some embodiments, the first conductive layer 110b can be coated with the first electrochemically active layer 130b on one side and with the second electrochemically active layer 135b on the other side. The first electrochemically active layer 130b can be adhered to the first conductive layer 110b and second conductive layer 120b at the same time as the second electrochemically active layer 135b is adhered to the third conductive layer 140b and first conductive layer 110b. Other examples are possible.

EXAMPLES

The following examples are provided to demonstrate the benefits of some embodiments of electrodes, electrochemical cells, and methods of forming the same. These examples are discussed for illustrative purposes and should not be construed to limit the scope of the disclosed embodiments.

Figures 5A, 5B:
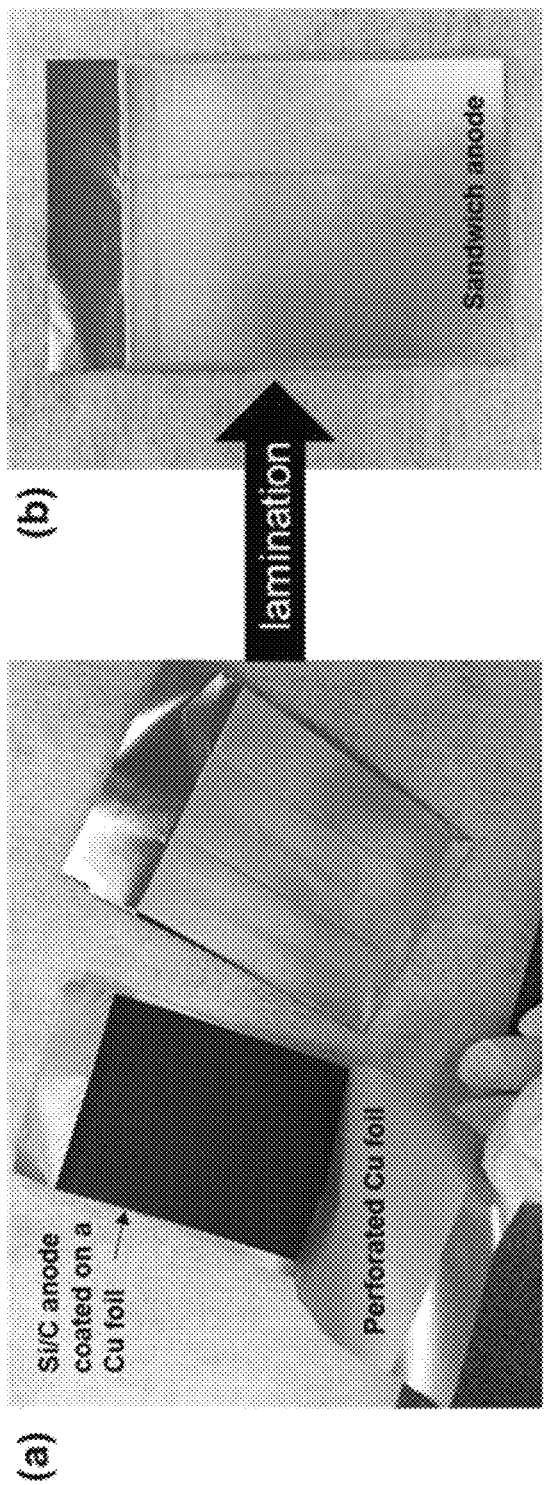
FIGS. 5a and 5b show an example sandwich electrode made in accordance with certain embodiments described herein.

FIGS. 5a and 5b show an example sandwich anode made in accordance with certain embodiments described herein. The sandwich anode was prepared by laminating perforated copper foils onto a coated silicon-carbon composite anode. For example, a silicon-carbon (Si/C) composite anode film was coated onto a copper foil current collector on both sides (e.g., a Si/C film sandwiching a copper current collector). The Si/C composite films contained silicon particles and polyimide resin as a binder. The coated anode was then sandwiched by perforated copper foils (Yasunaga Corporation of Japan, high density PF0.1 and PF0.4 foils, with 10 microns equivalent thickness), and laminated under pressure (approximately 20 MPa) and temperature (approximately 300° C.). The polyimide resin acted as a binder to attach the perforated copper foils onto the surfaces of the coated Si/C anode. The perforated copper foils and the original Si/C anode were integrated into a single piece after lamination, punched, and processed. The punched sandwich anode was annealed at a temperature of approximately 600° C. to sinter the layers together.

Figures 6A, 6B, 6C, 6D, 6E, 6F:
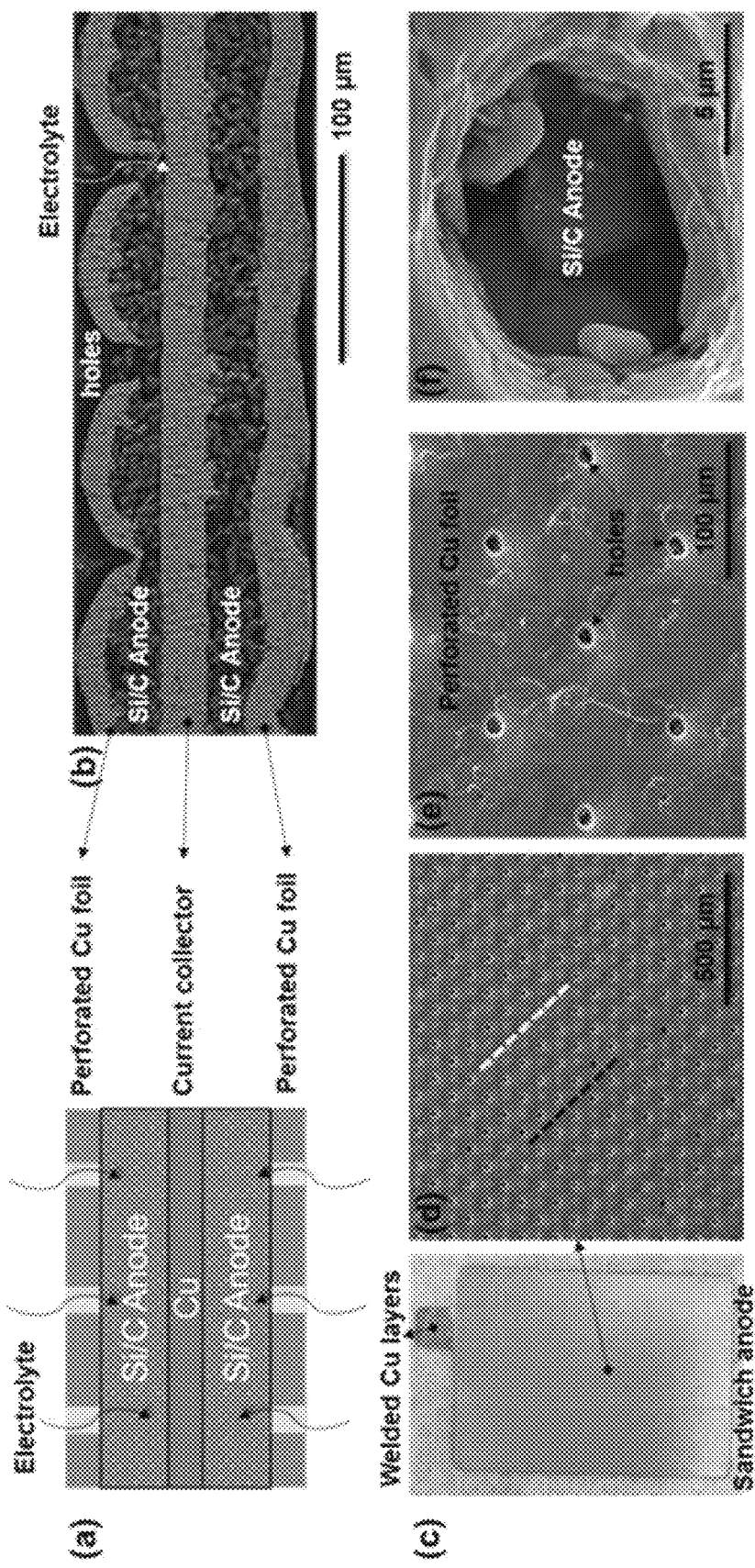
FIG. 6a schematically illustrates a cross sectional view of a sandwich electrode in accordance with certain embodiments described herein.
FIG. 6b is a Scanning Electron Microscopy (SEM) image showing the cross section of an example sandwich electrode.
FIG. 6c is a photograph of a top view of a punched sandwich electrode.
FIGS. 6d and 6e are SEM images showing the hole distribution in a perforated copper foil.
FIG. 6f is an SEM image showing Si/C composite film exposed through a hole of a perforated copper foil.

FIG. 6a-6f show the structure of a sandwich anode in accordance with certain embodiments described herein, including the side and top views. For example, FIG. 6a schematically illustrates a cross sectional view of an example sandwich anode. The sandwich anode includes two layers of Si/C composite anode coating a copper current collector and sandwiched between two layers of perforated copper foils. The perforated copper foils include holes for electrolyte to flow therethrough. FIG. 6b is a Scanning Electron Microscopy (SEM) image showing the cross section of an example sandwich anode. The SEM image shows that the top perforated copper foil can encapsulate the active Si/C anode films and that electrolyte can penetrate through the holes of the top perforated copper foil. The cross section of the bottom perforated copper foil intersected a region without holes, making the foil appear continuous and without holes. FIG. 6c shows a top view of the punched sandwich anode. The foils were welded at the tabs to provide an electron path though the foils. FIGS. 6d and 6e are SEM images showing the hole distribution in the perforated copper foil. The black and white dashed lines show possible positions that intersect with and without holes, which lead to the different cross sections viewed in FIG. 6b. For example, the perforated copper foil may appear to be continuous or with holes depending on the cutting position. FIG. 6f is an SEM image showing the Si/C film exposed through a hole of a perforated copper foil.

Figure 7A:
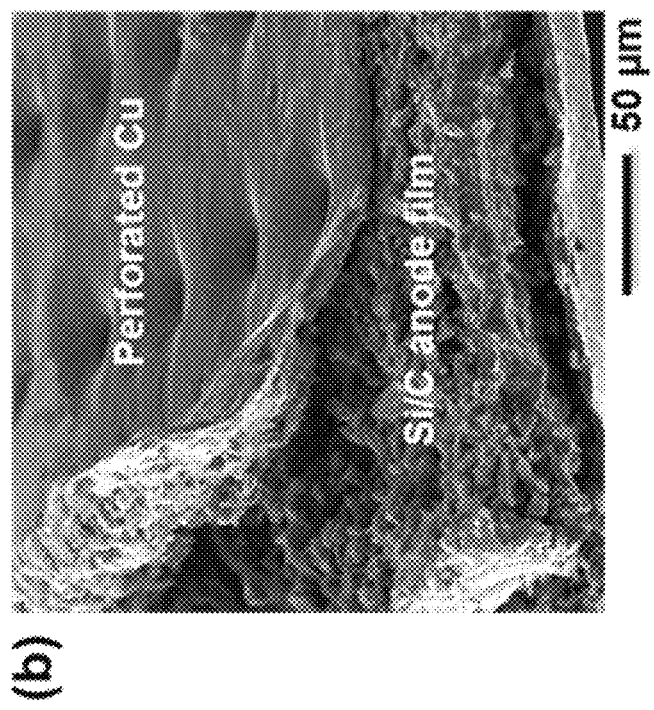
FIG. 7a is a photograph showing Si/C composite film adhering to the perforated copper foil.
Figure 7B:
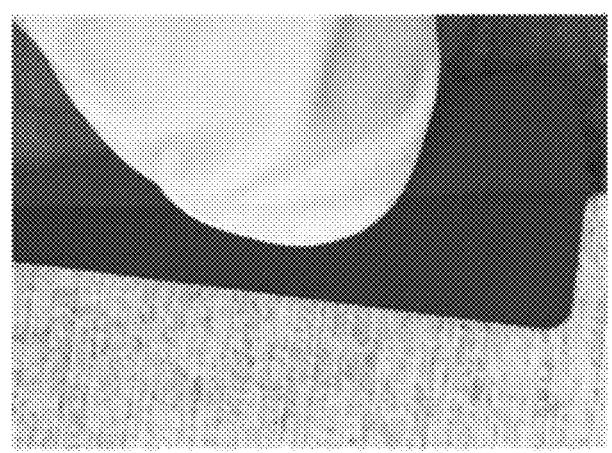
FIG. 7b is an SEM image showing the electrode film partially transferred to the perforated copper foil.

FIG. 7a is a photograph showing the gray Si/C film adhering to the perforated copper foil; and FIG. 7b is an SEM image showing the anode film partially transferred to the perforated copper foil, indicating good adhesion.

Figure 8A:
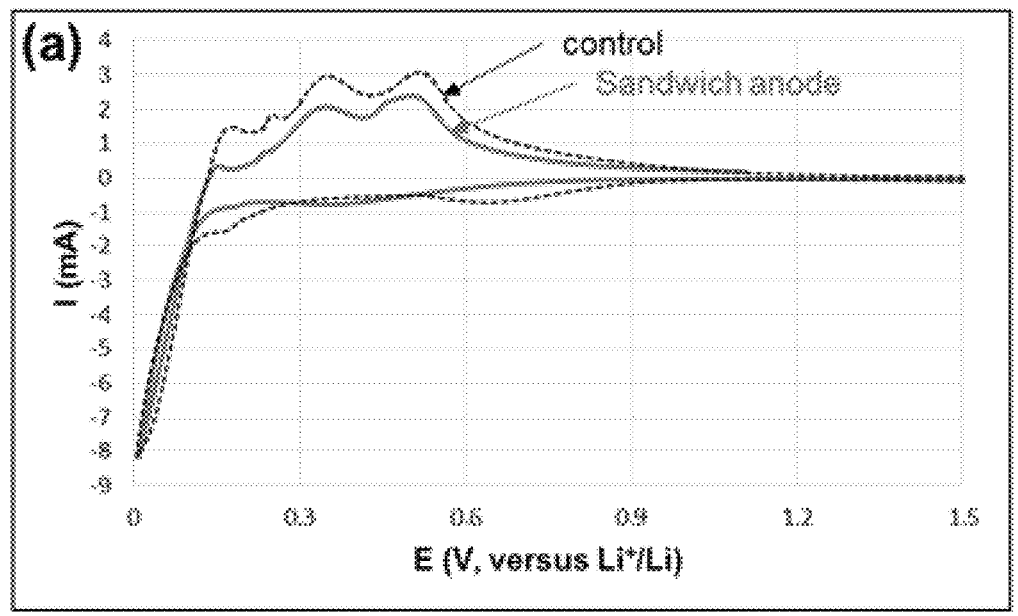
FIG. 8a shows half cell test results of an example sandwich electrode and a control electrode.
Figure 8B:
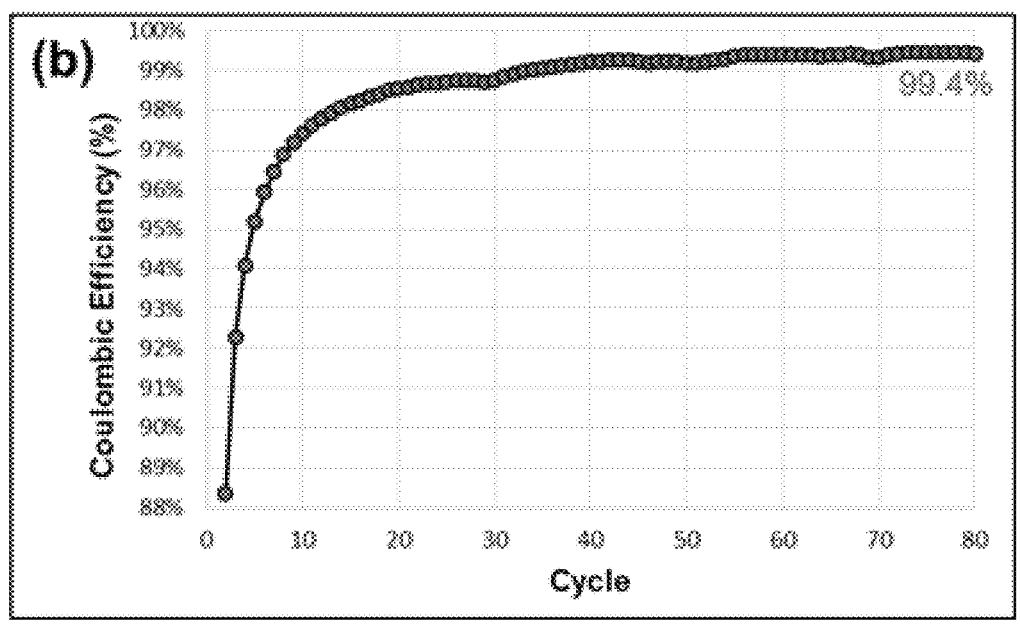
FIG. 8b shows the Coulombic efficiency of the example sandwich electrode.

Half cells tests were performed on the example sandwich anode and a control anode without perforated copper foils. As shown in FIG. 8a, cyclic voltammetry shows similar delithiation peaks in the first cycle for the sandwich anode (solid line) and the control anode (dashed line), indicating that the electrochemistry is not altered by the extra perforated copper layers. FIG. 8b shows the Coulombic efficiency of the sandwich anode was more than 99% after 35 cycles and 99.4% after 80 cycles (cycled at C/16 rate between 0.01V and 1.2V versus Li/Li+), indicating high reversibility of the sandwich anode.

Figure 9:
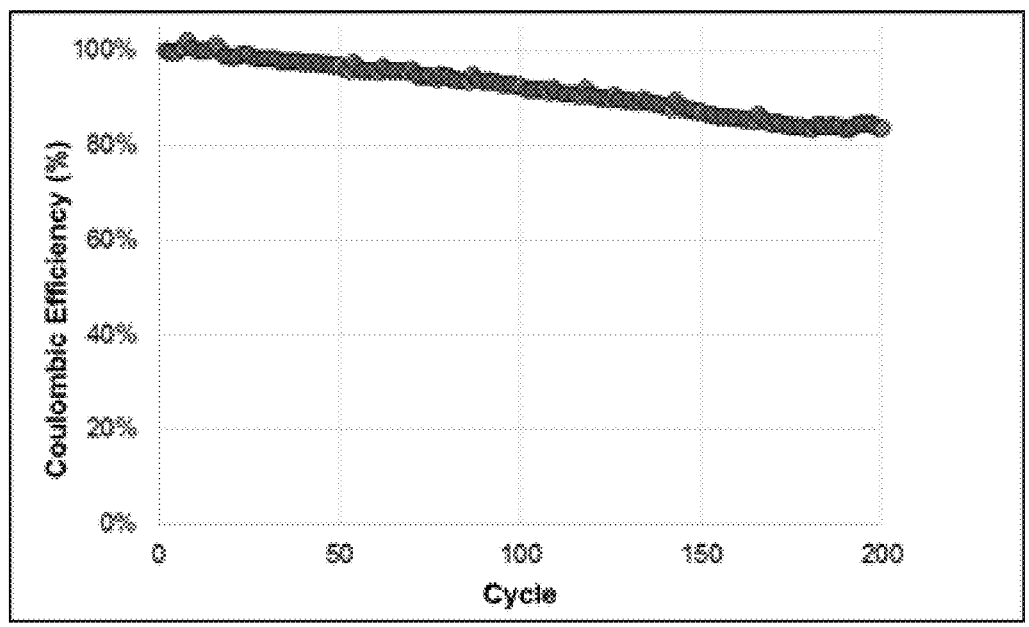
FIG. 9 shows the capacity retention of a cycled full cell having an example electrode as described herein.

The sandwich anode was also tested in a full cell. The sandwich anode was coupled with a $LiCoO_2$ cathode and an electrolyte containing 1.2 mol/L $LiPF_6$ salt in mixed solvents of fluoroethylene carbonate (FEC) and ethyl methyl carbonate (EMC) with a ratio of FEC/EMC=3:7. FIG. 9 shows that the capacity retention of the full cell cycled at 0.5 C between 4.3V and 3.3V was greater than 80% at 200 cycles.

Figures 10A, 10B:
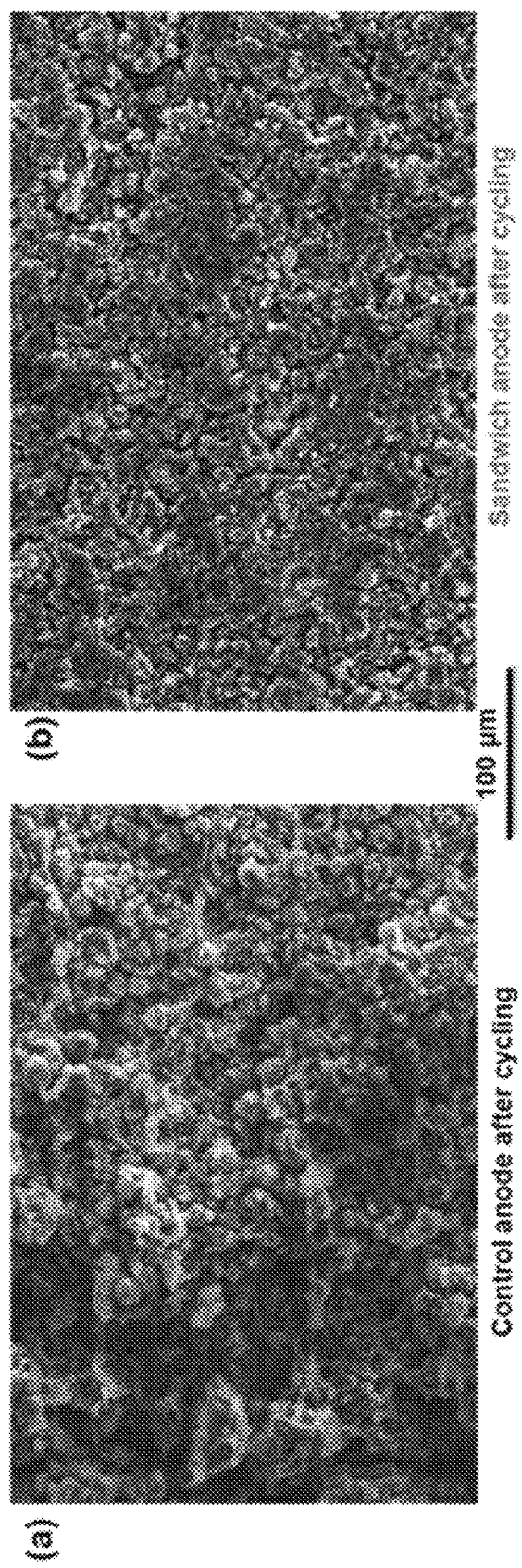
FIGS. 10a and 10b are SEM images of the control electrode and sandwich electrode respectively after cycling.

FIGS. 10a and 10b are SEM images of the control anode and sandwich anode respectively after cycling. The morphology of the control anode showed severe pulverization of active particles as some of the particles became dangling on the surface. The morphology of the sandwich anode after removing the perforated copper foil had uniform and flat surfaces without significant pulverization.

As described herein, compared with other electrodes, electrodes including silicon may exhibit more rapid capacity loss upon cycling due to relatively large volume changes. Certain embodiments described herein can incorporate a conductive layer with porosity to significantly improve the performance of silicon anodes. Certain embodiments can also be used in other electrodes that may suffer from degradation due to large volume changes during cycling, including but not limited to germanium, tin, and oxide electrodes. Additional examples can also include higher-voltage active materials such as lithium cobalt oxide, lithium cobalt aluminum oxide, various forms of lithium nickel manganese cobalt oxide (NMC), various forms of lithium manganese oxide (LMO), etc. Various embodiments can also be extended to multiple metal or other conductive layers in an electrode to provide enhanced mechanical strength and conductivity.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. An electrode comprising:
   a first conductive layer;
   a second conductive layer, at least one of the first and second conductive layers comprising porosity configured to allow an electrolyte to flow therethrough;
   a first electrochemically active layer comprising electrochemically active material sandwiched between the first and second conductive layers, wherein the first electrochemically active layer is in electrical communication with the first and second conductive layers;
   a third conductive layer; and
   a second electrochemically active layer comprising electrochemically active material sandwiched between the third conductive layer and the first or second conductive layer.

2. The electrode of claim 1, wherein the at least one of the first and second conductive layers comprises foam, mesh, or perforated material.

3. The electrode of claim 1, wherein the at least one of the first and second conductive layers comprises metal.

4. The electrode of claim 1, wherein the at least one of the first and second conductive layers comprises nickel foam.

5. The electrode of claim 1, wherein the at least one of the first and second conductive layers comprises a perforated copper foil.

6. The electrode of claim 1, wherein the at least one of the first and second conductive layers comprises carbon.

7. The electrode of claim 1, wherein the at least one of the first and second conductive layers comprises both the first and second conductive layers.

8. The electrode of claim 1, wherein the first and/or second electrochemically active layer comprises silicon, germanium, tin, oxide, graphite, or a combination thereof.

9. The electrode of claim 1, wherein the first and/or second electrochemically active layer comprises a film.

10. The electrode of claim 9, wherein the film comprises a silicon carbon composite film.

11. The electrode of claim 1, wherein the first and/or second electrochemically active layer comprises at least about 50% to about 99% by weight of silicon.

12. The electrode of claim 11, wherein the first and/or second electrochemically active layer comprises the silicon at about 60% to about 99% by weight.

13. The electrode of claim 12, wherein the first and/or second electrochemically active layer comprises the silicon at about 70% to about 99% by weight.

14. The electrode of claim 13, wherein the first and/or second electrochemically active layer comprises the silicon at about 80% to about 99% by weight.

15. The electrode of claim 1, further comprising an attachment substance between the first and/or second electrochemically active layer and the first and/or second conductive layer.

16. The electrode of claim 15, wherein the attachment substance comprises polyamideimide, polyimide resin, polyacrylic acid, or a combination thereof.

17. The electrode of claim 1, wherein the first electrochemically active layer and the second electrochemically active layer comprise the same electrochemically active material.

18. The electrode of claim 1, wherein the electrode is a negative electrode.

19. An electrochemical cell comprising the electrode of claim 1.

20. The electrochemical cell of claim 19, wherein the electrochemical cell comprises a lithium ion battery.

* * * * *